(12) United States Patent
Szabo

(10) Patent No.: US 8,983,510 B2
(45) Date of Patent: *Mar. 17, 2015

(54) METHOD, APPARATUS, AND COMPUTER PROGRAM PRODUCT FOR PROVIDING CONFIRMED OVER-THE-AIR TERMINAL CONFIGURATION

(71) Applicant: Core Wireless Licensing S.a.r.l., Luxembourg (LU)

(72) Inventor: Tamas.Zs Szabo, Budapest (HU)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,842

(22) Filed: May 1, 2013

(65) Prior Publication Data

US 2013/0244704 A1    Sep. 19, 2013

Related U.S. Application Data

(63) Continuation of application No. 11/410,810, filed on Apr. 25, 2006, now Pat. No. 8,437,751.

(51) Int. Cl.
*H04W 4/00* (2009.01)
*H04W 24/02* (2009.01)
(Continued)

(52) U.S. Cl.
CPC ............... *H04W 24/02* (2013.01); *H04L 12/00* (2013.01); *H04L 12/2602* (2013.01);
(Continued)

(58) Field of Classification Search
USPC ......... 455/574, 525, 436, 438, 510, 414, 567, 455/564, 417, 555, 3.01, 67, 226.2, 566, 455/433, 502, 419, 458, 67.13; 709/206, 709/245, 220, 227; 370/352, 328, 338, 389, 370/349, 329, 252, 310, 393
See application file for complete search history.

(56) References Cited

U.S. PATENT DOCUMENTS

| 5,467,467 A | 11/1995 | Ozawa |
| 5,509,050 A | 4/1996 | Berland |

(Continued)

FOREIGN PATENT DOCUMENTS

| EP | 0804046 A2 | 10/1997 |
| WO | 96/27270 A1 | 9/1996 |

(Continued)

OTHER PUBLICATIONS

"OMA Device Management Protocol: Candidate Version 1.2," Open Mobile Alliance Ltd., Document No. OMA-TS-DM-Protocol-V1_2-20060424-C, Apr. 24, 2006, <http://openmobilealliance.org/Technical/release_program/docs/DM/V1_2-20060424-C/OMA-TS-DM-ProtocolV1_2-20060424-C.pdf>. (9 pages).

(Continued)

*Primary Examiner* — Joseph Arevalo

(57) ABSTRACT

An apparatus for providing confirmed OTA terminal configuration includes a processing element configured to communicate configuration data to a mobile terminal. The processing element is also configured to initiate a confirmation sequence to confirm proper receipt of the configuration data at the mobile terminal, and to receive information indicating whether the configuration data was properly received at the mobile terminal.

24 Claims, 7 Drawing Sheets

(51) Int. Cl.
*H04L 12/00* (2006.01)
*H04L 12/26* (2006.01)
*H04L 29/06* (2006.01)
*H04L 12/24* (2006.01)
*H04M 1/00* (2006.01)
*H04W 8/24* (2009.01)
*H04L 29/08* (2006.01)
*H04L 29/14* (2006.01)
*H04W 88/02* (2009.01)

(52) U.S. Cl.
CPC ........... *H04L 29/06* (2013.01); *H04L 41/0866* (2013.01); *H04M 1/00* (2013.01); *H04W 8/245* (2013.01); *H04L 67/34* (2013.01); *H04L 67/125* (2013.01); *H04L 67/04* (2013.01); *H04L 69/40* (2013.01); *H04L 41/0886* (2013.01); *H04W 88/02* (2013.01)
USPC ........... 455/466; 455/574; 455/525; 455/436; 455/438; 455/510; 455/414; 455/567; 455/564; 455/417

(56) References Cited

U.S. PATENT DOCUMENTS

| | | | |
|---|---|---|---|
| 7,031,267 | B2 | 4/2006 | Krumel |
| 7,266,106 | B2 | 9/2007 | Nylander et al. |
| 7,277,416 | B1 | 10/2007 | Chang et al. |
| 7,584,257 | B2 | 9/2009 | Isaacs et al. |
| 7,610,239 | B1 | 10/2009 | Silverman et al. |
| 7,653,200 | B2 * | 1/2010 | Karmi et al. ................ 380/270 |
| 7,653,734 | B1 | 1/2010 | Aho |
| RE43,071 | E | 1/2012 | Gerendai et al. |
| 8,265,038 | B2 | 9/2012 | Kezys et al. |
| 2001/0029178 | A1 | 10/2001 | Criss et al. |
| 2002/0083331 | A1 | 6/2002 | Krumel |
| 2002/0099842 | A1 | 7/2002 | Jennings et al. |
| 2003/0007504 | A1 | 1/2003 | Berry et al. |
| 2003/0008653 | A1 | 1/2003 | Jiang |
| 2003/0128981 | A1 | 7/2003 | Shiomoto et al. |
| 2003/0204406 | A1 | 10/2003 | Reardon et al. |
| 2004/0033798 | A1 | 2/2004 | Robin et al. |
| 2004/0087320 | A1 * | 5/2004 | Kim et al. ................ 455/458 |
| 2004/0185852 | A1 | 9/2004 | Son et al. |
| 2005/0030973 | A1 | 2/2005 | Kitamura |
| 2005/0068169 | A1 | 3/2005 | Copley et al. |
| 2005/0114315 | A1 | 5/2005 | Tanner et al. |
| 2005/0124366 | A1 | 6/2005 | Hassan et al. |
| 2005/0124367 | A1 | 6/2005 | Hassan et al. |
| 2005/0156735 | A1 | 7/2005 | Humphries et al. |
| 2005/0228847 | A1 | 10/2005 | Hayes, Jr. |
| 2006/0018293 | A1 | 1/2006 | Farley et al. |
| 2006/0045073 | A1 | 3/2006 | Niska et al. |
| 2006/0059224 | A1 | 3/2006 | Yao |
| 2006/0083199 | A1 | 4/2006 | Yang |
| 2006/0109848 | A1 | 5/2006 | Blasco Claret et al. |
| 2006/0165060 | A1 | 7/2006 | Dua |
| 2006/0182108 | A1 | 8/2006 | Krumel |
| 2006/0274696 | A1 | 12/2006 | Krishnamurthi |
| 2007/0096283 | A1 | 5/2007 | Ljung et al. |
| 2007/0110046 | A1 | 5/2007 | Farrell et al. |
| 2007/0130290 | A1 * | 6/2007 | van der Winkel ............. 709/219 |
| 2007/0149226 | A1 | 6/2007 | De Vries |
| 2007/0171871 | A1 | 7/2007 | Forsberg |
| 2007/0180089 | A1 | 8/2007 | Fok et al. |
| 2007/0254648 | A1 | 11/2007 | Zhang et al. |
| 2008/0097874 | A1 | 4/2008 | Reardon et al. |
| 2008/0305773 | A1 | 12/2008 | Hundscheidt et al. |
| 2009/0300141 | A1 | 12/2009 | Frentzel-Beyme et al. |
| 2009/0313344 | A1 | 12/2009 | Beyme et al. |
| 2010/0122325 | A1 | 5/2010 | Plestid et al. |
| 2011/0216726 | A1 | 9/2011 | Skog et al. |

FOREIGN PATENT DOCUMENTS

| | | |
|---|---|---|
| WO | 97/14258 A1 | 4/1997 |
| WO | 98/41044 A2 | 9/1998 |
| WO | 9841014 A1 | 9/1998 |
| WO | 01/63900 A1 | 8/2001 |
| WO | 2006045335 A1 | 5/2006 |

OTHER PUBLICATIONS

"OMA Device Management Protocol: Candidate Version 1.2," Open Mobile Alliance Ltd., Document No. OMA-TS-DM-Protocol-V1_2-20060602-C, Jun. 2, 2006, (51 pages).

"Requirements for Radio Software Download for RF Reconfiguration," SDR Forum, Document No. SDRF-02-S-007-V1.0.0, dated Nov. 13, 2002 (41 pages).

3rd Generation Partnership Project 2 ("3GPP2"), OTASP and OTAPA; Jan. 1999; 401 pages; Version 1.0, 3GPP2 N S0011-0. (401 pages).

* cited by examiner

METHOD, APPARATUS, AND COMPUTER PROGRAM PRODUCT FOR PROVIDING CONFIRMED OVER-THE-AIR TERMINAL CONFIGURATION

TECHNOLOGICAL FIELD

Embodiments of the present invention relate generally to mobile electronic device technology and, more particularly, relate to methods, apparatuses, and a computer program product for providing over-the-air confirmation of configurations received at mobile electronic devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from applications stored at a network server or other network device, or even at the mobile terminal such as, for example, a mobile telephone, a mobile television, a mobile gaming system, etc.

For applications which are not already supported at a mobile terminal or which are supported but not ready to use, it is often necessary for a user of the mobile terminal to receive configuration settings from the network prior to launching an application. The configuration settings may be sent over-the-air (OTA) via a wireless communication network. Accordingly, if a new application is downloaded at the mobile terminal, the network will typically transmit corresponding configuration settings to the mobile terminal which will enable the mobile terminal to launch the application in the future. However, it is currently common that if the network sends configuration settings for a new application to the user based on either a user or network initiated request, the network will not know whether the configuration settings have been properly received at the mobile terminal unless the network is notified of such failure by the user. For example, the user may call a network help desk to request retransmission of the settings. Furthermore, even in certain current systems which "confirm" receipt of configuration settings, the confirmation is essentially merely a confirmation that the mobile terminal received at least some settings and not that correct settings have been received. In any case, a failure to verify that proper configuration settings have been received at the mobile terminal can lead to user dissatisfaction and increase consumption of network resources in order to resolve trouble reports resulting from situations in which proper configuration settings are not received at the mobile terminal.

In light of the shortcomings described above, there may be a need to develop a configuration mechanism capable of verifying that correct configuration settings are received by a mobile terminal OTA.

BRIEF SUMMARY

Methods, apparatuses and a computer program product are therefore provided that enable confirmed OTA terminal configuration. In particular, a device management system is provided that is capable of transmitting service configuration data to a mobile terminal and subsequently initiating a confirmation sequence to verify that the service configuration data has been correctly received at the mobile terminal. Accordingly, in some situations, proper configuration may automatically be ensured prior to a failed user attempt to launch an application, thereby increasing user satisfaction and decreasing impacts upon network resources due to user trouble reporting.

In one exemplary embodiment, a method of providing confirmed OTA terminal configuration is provided. The method includes communicating configuration data to a mobile terminal, initiating a confirmation sequence to confirm proper receipt of the configuration data at the mobile terminal, and receiving information indicating whether the configuration data was properly received at the mobile terminal.

In another exemplary embodiment, a computer program product for providing confirmed OTA terminal configuration is provided. The computer program product includes at least one computer-readable storage medium having computer-readable program code portions stored therein. The computer-readable program code portions include first, second and third executable portions. The first executable portion is for communicating configuration data to a mobile terminal. The second executable portion is for initiating a confirmation sequence to confirm proper receipt of the configuration data at the mobile terminal. The third executable portion is for receiving information indicating whether the configuration data was properly received at the mobile terminal.

In another exemplary embodiment, a method of providing confirmed OTA terminal configuration is provided. The method includes receiving a request for establishing a server initiated session with a mobile terminal from a network device, sending a connection request to the mobile terminal in response to receipt of the request for establishing the server initiated session, communicating a sample message to the mobile terminal in response to an indication of a connection with the mobile terminal, and communicating a notification to the network device in response to acknowledgment from the mobile terminal, the notification including information indicating whether the configuration data was properly received at the mobile terminal.

In another exemplary embodiment, an apparatus for providing confirmed OTA terminal configuration is provided. The apparatus includes a processing element configured to communicate configuration data to a mobile terminal, initiate a confirmation sequence to confirm proper receipt of the configuration data at the mobile terminal, and receive information indicating whether the configuration data was properly received at the mobile terminal.

In another exemplary embodiment, an apparatus for providing confirmed OTA terminal configuration is provided. The apparatus includes a processing element configured to receive a request for establishing a server initiated session with a mobile terminal from a network device, send a connection request to the mobile terminal in response to receipt of the request for establishing the server initiated session, communicate a sample message to the mobile terminal in response to an indication of a connection with the mobile terminal, and communicate a notification to the network device in response to acknowledgment from the mobile terminal, the notification including information indicating, whether the configuration data was properly received at the mobile terminal.

In another exemplary embodiment, an apparatus for providing confirmed OTA terminal configuration is provided. The apparatus includes a means for communicating configuration data to a mobile terminal, a means for initiating a confirmation sequence to confirm proper receipt of the configuration data at the mobile terminal, and a means for receiving information indicating whether the configuration data was properly received at the mobile terminal.

BRIEF DESCRIPTION OF THE SEVERAL VIEWS OF THE DRAWING(S)

Having thus described an embodiment of the invention in general terms, reference will now be made to the accompanying drawings, which are not necessarily drawn to scale, and wherein:

DETAILED DESCRIPTION

Figure 1:
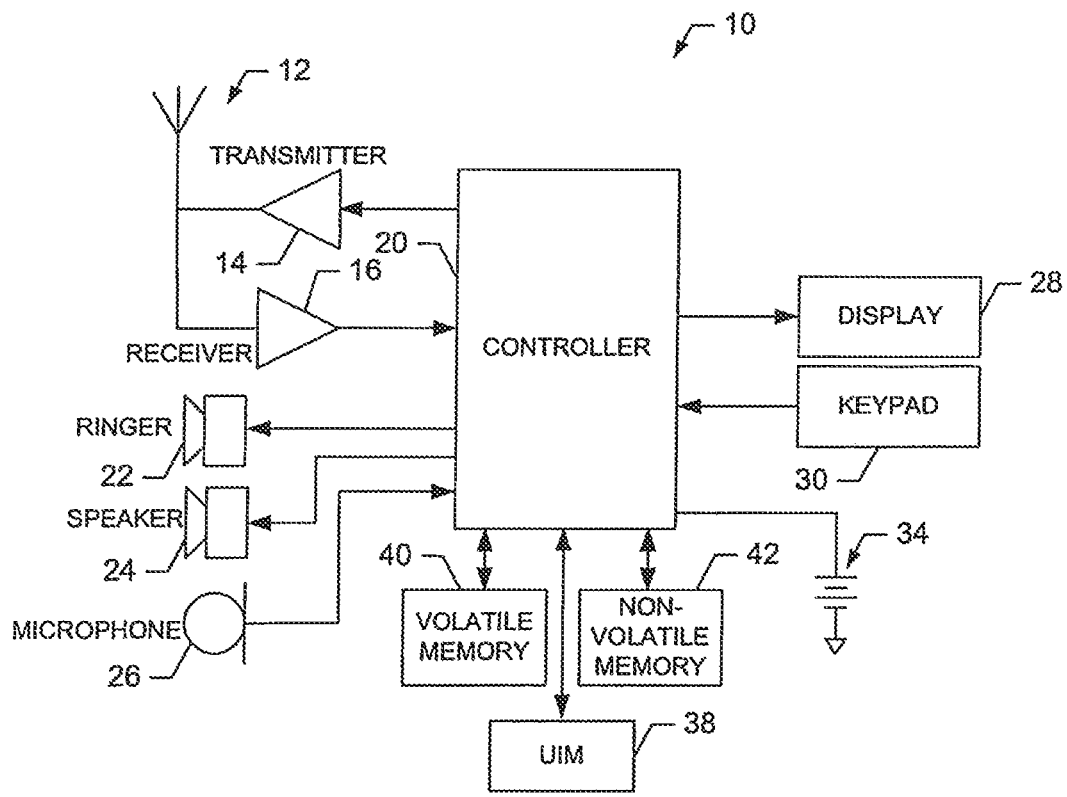
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, examples of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit their scope. While several embodiments of the mobile terminal 10 are illustrated and will be hereinafter described for purposes of example, other types of mobile terminals, such as portable digital assistants (PDAs), pagers, mobile televisions, laptop computers, gaming devices and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of various embodiments will be primarily described in conjunction with mobile communications applications. It should be understood, however, that the system and method of the various embodiments can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. Also, for example, the controller 20 may be capable of operating a software application capable of analyzing text and selecting music appropriate to the text. The music may be stored on the mobile terminal 10 or accessed as Web content.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity module (UIM) 38. The UIM 38 is typically a memory device having a processor built in. The UIM 38 may include, for example, a subscriber identity module (USIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
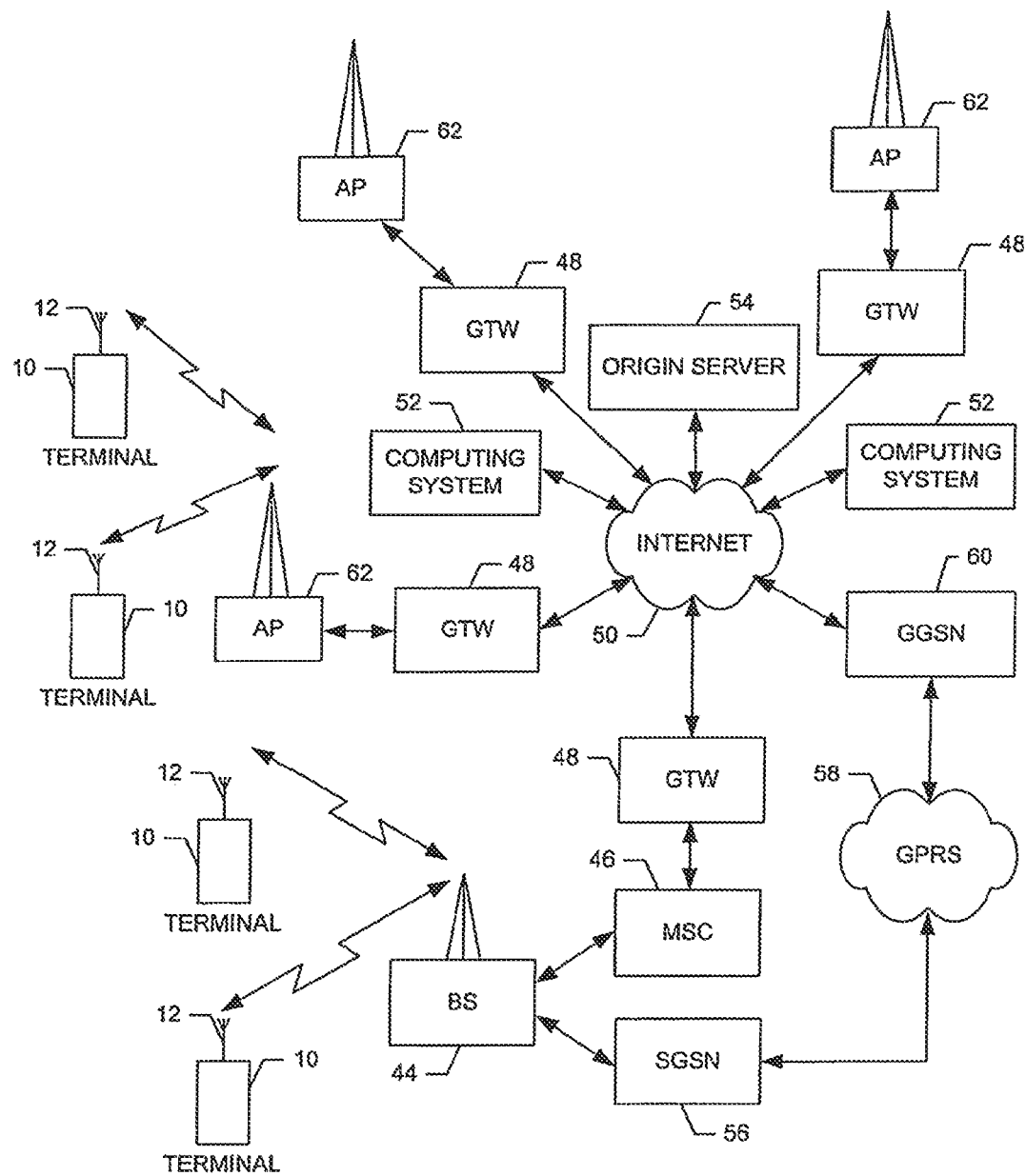
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (ET), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the ES 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the embodiments of the invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, in which certain elements of a system for providing confirmed over-the-air (OTA) terminal configuration are displayed. The system of FIG. 3 may include, for example, the mobile terminal 10 of FIG. 1. However, it should be noted that the system of FIG. 3, may also be employed in conjunction with a variety of other devices, both mobile and fixed, and therefore, the embodiments of the present invention should not be limited to application with devices such as the mobile terminal 10 of FIG. 1. It should also be noted, however, that while FIG. 3 illustrates one example of a configuration of a system for providing efficient evaluation in feature transformation, numerous other configurations may also be used to implement embodiments of the present invention.

Figure 3:
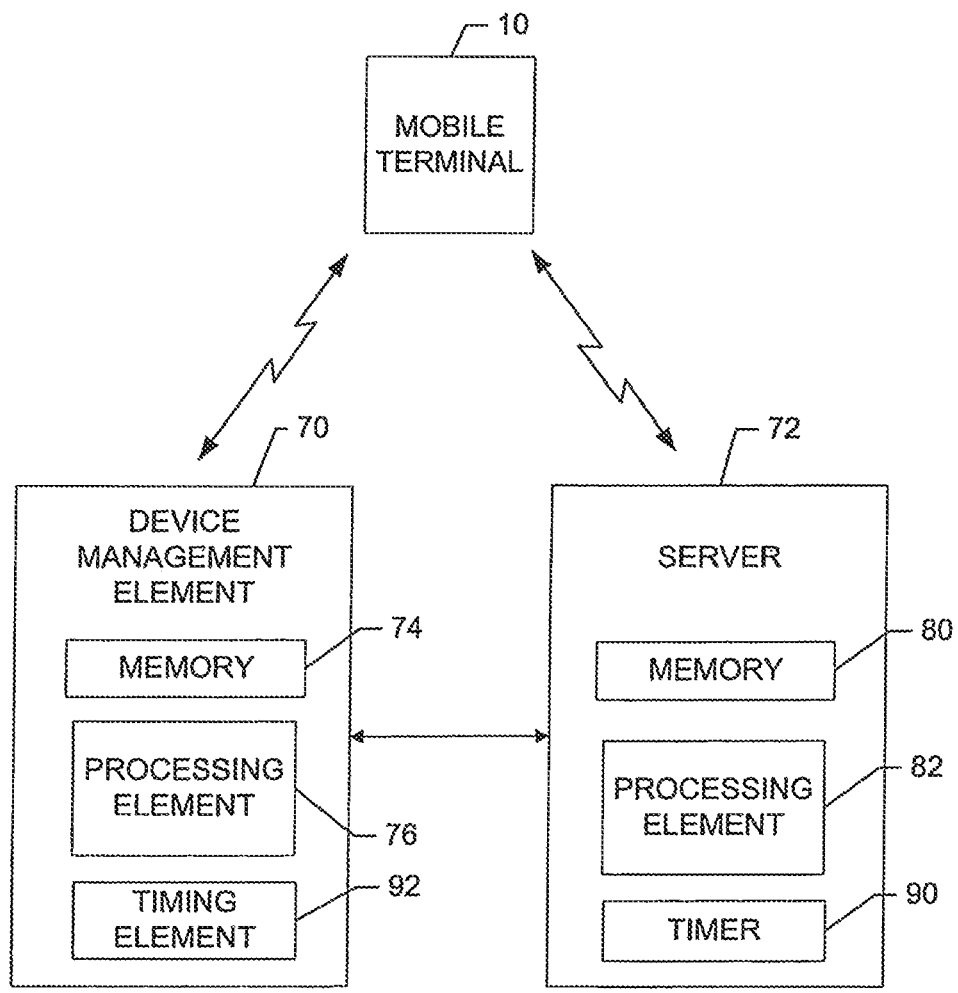
FIG. 3 illustrates a block diagram of portions of a system for providing confirmed over-the-air (OTA) terminal configuration according to an exemplary embodiment of the present invention.

Referring now to FIG. 3, a system for providing confirmed OTA terminal configuration is provided. The system includes the mobile terminal 10 and network devices including a device management element 70, and a server 72 such as a value added server. It should be noted that although FIG. 3 illustrates the device management element 70 as being a separate element from the server 72, the device management element 70 and the server 72 may also be collocated or embodied in a single module, apparatus or device capable of performing the functions of both the device management element 70 and the server 72. Additionally, communication between the mobile terminal 10, the device management element 70 and the server 72 may be either wired or wireless. However, according to an exemplary embodiment, communication between either the device management element 70 or the server 72 and the mobile terminal 10 are conducted wirelessly (i.e., OTA), for example, in accordance with any of the communication mechanisms described above. Meanwhile, communication between the device management element 70 and the server 72 may be either wired or wireless.

The device management element 70 may be any device or means embodied in either hardware, software, or a combination of hardware and software capable of transmitting configuration data to the mobile terminal 10 and subsequently initiating a confirmation sequence. In an exemplary embodiment, the device management element 70 may be embodied in software as instructions that are stored on a memory of a network device and executed by a processing element. Alternatively, the device management element 70 may include a memory device 74 and a processing element 76 capable of executing instructions stored on the memory device 74 in which the instructions include code portions for initiating the confirmation sequence and transmitting configuration data (i.e. service configuration settings) to the mobile terminal 10. Accordingly, the device management element 70 may include storage for configuration data for transmission to the mobile terminal 10. Alternatively, the device management element 70 may be capable of accessing the configuration data at another network element or device, and thereafter, transmitting the configuration data to the mobile terminal 10. The device management element 70 may be capable of transmitting the configuration data, for example, in response to a user request initiated at the mobile terminal 10, in response to input by a network operator, or automatically in response to network side or user end originated stimuli. In other words, the configuration data may be either pulled from the device management element 70 by the mobile terminal 10 or pushed to the mobile terminal 10 from the device management element 70.

The server 72 may be any device or means embodied in either hardware, software, or a combination of hardware and software capable of providing a service for which corresponding configuration data stored or otherwise accessible at an external device enables the external device to access the service. In an exemplary embodiment, the server 72 may be an abstract server that provides a service such as, for example, wireless application protocol (WAP), multimedia message service (MMS), Push-to-talk over cellular (PoC), session initiation protocol (SIP), etc. The server 72 may include a memory device 80 and a processing element 82 capable of executing instructions stored on the memory device 80. Accordingly, the memory device 80 may store instructions for execution by the processing element 82 in order to carry out particular functions or applications associated with the server 72. In an exemplary embodiment, the server 72 may include an application program interface (API) for communicating with the device management element 70 in order to enable the server 72 to trigger a server initiated session with the mobile terminal 10 in response to a request from the device management element 70. In other words, the server 72 may include an API for initiating a confirmation sequence in response to a request from the device management element 70. According to an exemplary embodiment, during the confirmation sequence, the server 72 may request a connection with the mobile terminal 10, which, if opened, enables the server 72 to send a sample message or sample content to the mobile terminal 10 in order to verify proper receipt of the configuration data. The server 72 may then notify the device management element 70 of the proper receipt of the configuration data at the mobile terminal 10.

It should be noted that the processing elements 76 and 82 may be embodied in many ways. For example, the processing elements 76 and 82 may be embodied as a processor, a coprocessor, a controller or various other processing means or devices including integrated circuits such as, for example, an ASIC (application specific integrated circuit).

Figure 4:
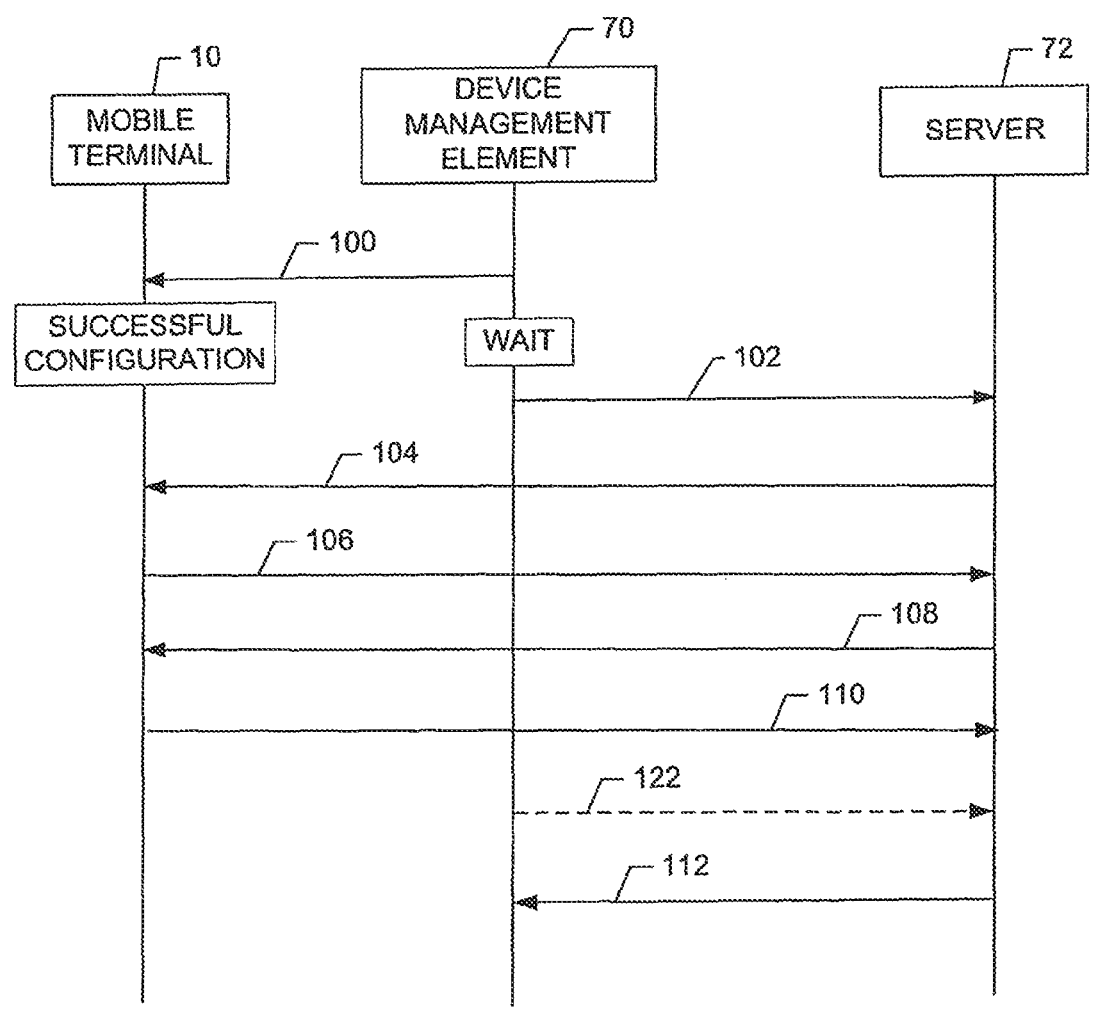
FIG. 4 illustrates a control flow diagram for a method of providing confirmed OTA terminal configuration according to an exemplary embodiment of the present invention.
Figure 5:
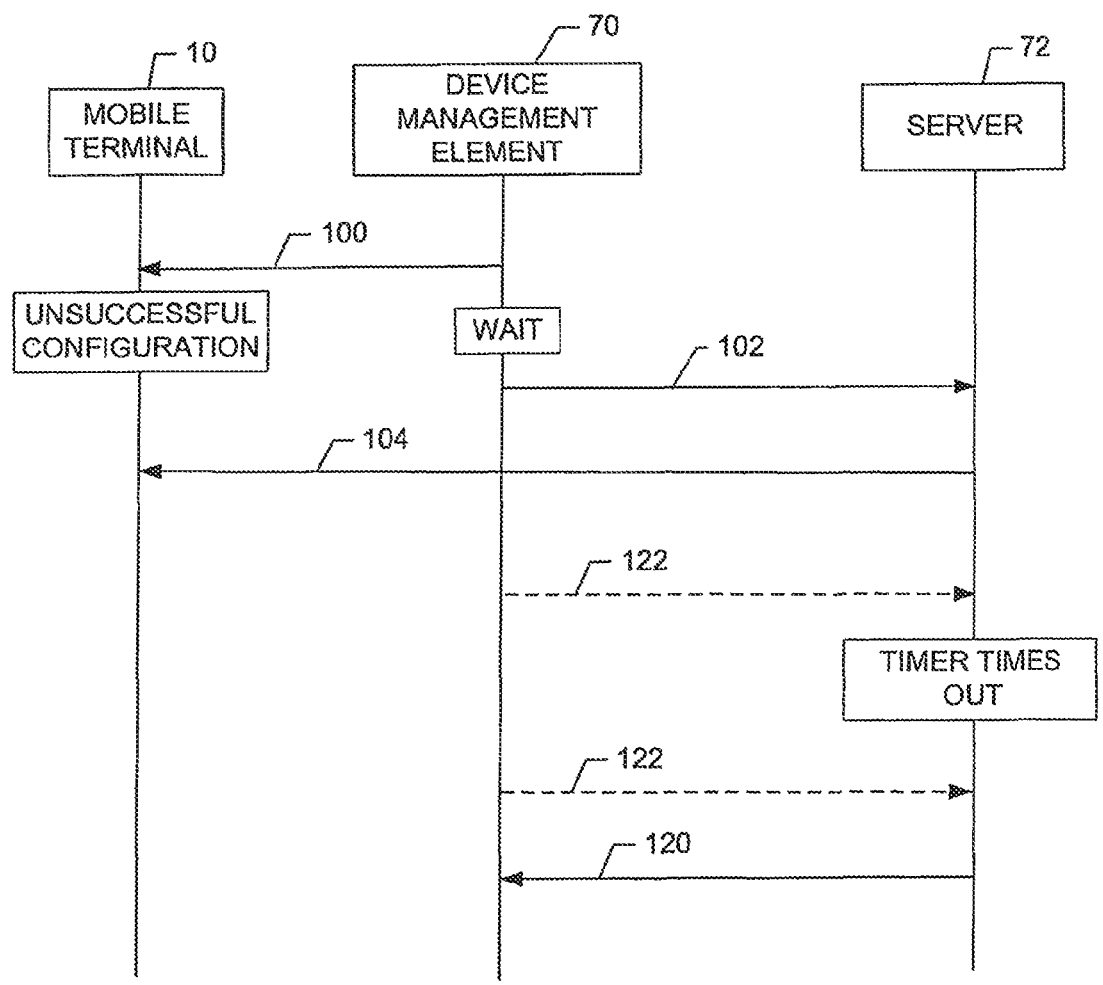
FIG. 5 illustrates a control flow diagram for a method of providing confirmed OTA terminal configuration according to an exemplary embodiment of the present invention.

FIGS. 4 and 5 each illustrate a control flow diagram according to an exemplary method for providing confirmed OTA terminal configuration. In this regard. FIG. 4 illustrates an example in which configuration data is properly received at the mobile terminal 10. It will be assumed in describing FIGS. 4 and 5, that configuration data (i.e., settings for service configuration) to support a service or an application (e.g., WAP, MMS, PoC, SIP, etc.) have been requested or otherwise indicated to be delivered to the mobile terminal 10. For example, the configuration data may be requested by the user of the mobile terminal 10 via an initiation event or trigger as part of a self service program. Accordingly, the user may call a particular phone number, send a short message service (SMS) message, activate a link at a particular website, etc., in order to request the configuration data directly, or request the application or service which requires associated configuration data in order for the application or service to be accessible by the mobile terminal 10. As an alternative example, a network operator or other network device may initiate transmission of the configuration data, for example, to send configuration data corresponding to an upgraded application, a free application, a trial application, a repair, a bug fix, etc. to the mobile terminal 10.

Accordingly, following receipt of any such initiation event or trigger as described above or otherwise suitable at the device management element 70, the device management element 70 transmits or otherwise communicates configuration data 100 to the mobile terminal 10. Following communication of the configuration data 100 to the mobile terminal 10, the device management element 70 waits a predetermined period of time before initiating a confirmation sequence by sending a session request message 102 to the server 72. The predetermined period of time may be any time period. However, relatively short (i.e., seconds or minutes) or relatively long time periods (i.e. days) may not be practical. For example, if the predetermined period of time is too short, the configuration data 100 may not be fully received at the mobile terminal 10 due Co network delays. Meanwhile, if the predetermined period of time is too long, the user of the mobile terminal 10 may launch or attempt to launch the application corresponding to the configuration settings 100 during the predetermined period of time, thereby either obviating any need or desire to confirm proper receipt of the configuration data 100 (since a successful launch of the application will confirm proper receipt) or subject the user to undesirable aggravation (if the application fails to launch due to failure to properly receive the configuration data). Regardless of a length of the predetermined period of time, if the user successfully launches the application at any time between transmission of the configuration data 100 and completion of the confirmation sequence, the confirmation sequence may be terminated or preempted, since confirmation of proper receipt of the configuration data 100 will have been provided by the successful launch of the application. Unsuccessful user attempts to launch the application may have no effect on the confirmation sequence. The confirmation sequence, which in this exemplary embodiment includes each of the messages exchanged and described below in connection with reference numerals 102 to 112, confirms OTA proper receipt of the configuration data 100 at the mobile terminal 10.

The session request message 102 requests that the server 72 establish a session with the mobile terminal 10 to enable confirmation that the configuration data 100 was properly received at the mobile terminal 10. In response to receipt of the session request message 102, the server 72 may send an indication 104 to the mobile terminal 10. The indication 104 may request a server initiated session with the mobile terminal 10. For example, the indication 104 may be an MMS message indicating to the mobile terminal 10 that the server 72 has information for the mobile terminal 10. In response to receipt of the indication 104, the mobile terminal 10 may establish a connection with the server 72. For example, the mobile terminal 10 may send a receive MMS 106 to the server 72 requesting the information from the server 72 via the connection. In response to receipt of the receive MMS 106, the server 72 may transmit sample content 108 to the mobile terminal 10 via the connection. The sample content 108 may be, for example, pre-recorded information such as a sample MMS. In response to receipt of the sample content 108, the mobile terminal 10 may send an acknowledgment 110 which is indicative that the sample content 108 has been received at the mobile terminal 10. By virtue of the mobile terminal 10 being able to properly communicate with the server 72 to acknowledge receipt of the sample content 108, proper receipt of the configuration data 100 at the mobile terminal 10 is confirmed.

In response to receipt of the acknowledgment 110, the server 72 sends a notification message 112 to the device management element 70 to indicate that the configuration data 100 has been properly received at the mobile terminal 10. In response to receipt of the notification message 112, the device management element 70 may refrain from any further attempts to transmit the configuration data 100 to the mobile terminal 10.

It should be noted that although the preceding was described in the context of an embodiment in which the device management element 70 requests that the server 72 conducts the confirmation sequence, other embodiments are also possible. For example, in one exemplary embodiment, the device management element 70 may itself execute the confirmation sequence. In other words, messages described above as originating at the server 72 may instead originate at the device management element 70 and communication between the server 72 and the device management element 70 would not be necessary. Furthermore, according to this exemplary embodiment, the mobile terminal 10 may receive the request for the server initiated session and the sample content from the device management element 70 and subsequently acknowledge receipt of the sample content to the device management element 70.

FIG. 5 illustrates an example in which configuration data is not properly received at the mobile terminal 10. Following receipt of any initiation event or trigger as described above, the device management element 70 transmits or otherwise communicates the configuration data 100 to the mobile terminal 10. Following communication of the configuration data 100, the device management element 70 waits the predetermined period of time before initiating the confirmation sequence by sending the session request message 102 to the server 72. In response to receipt of the session request message 102, the server 72 may send the indication 104 to the mobile terminal 10 such as the MMS message indicating to the mobile terminal 10 that the server 72 has information for the mobile terminal 10. In a case in which the configuration data 100 is not properly received at the mobile terminal 10, the mobile terminal 10 may not establish a connection with the server 72. The server 72 may include (or otherwise be in communication with) a timer 90 capable, for example, of "timing out" in response to expiration of a predetermined period of time between sending the indication 104 and receiving a connection with the mobile terminal 10. Accordingly, if the timer 90 times out before the connection is established, the timer 90 may send a failure notification message 120 to the device management element 70 indicating that the configuration data 100 has not been properly received at the mobile terminal 10. Accordingly, the device management element 70 may retransmit the configuration data 100 to the mobile terminal 10 and, after the predetermined period of time, initiate another confirmation sequence as described above.

It should be noted that although the preceding exemplary embodiment described the timer 90 disposed in communication with the server 72, in an alternative exemplary embodiment, the device management element 70 may include a timing element 92 instead of or in addition to the timer 90 disposed in communication with the server 72. Accordingly, the timing element 92 of the device management element 70 may "time out" if the notification message 112 is not received from the server 72 within a predetermined period of time from the transmission of the session request message 102. Additionally or alternatively, in an exemplary embodiment, the timing element 71 may be configured to send an inquiry 122 to the server 72 to check whether the acknowledgment 110 has been received by the server 72 at predetermined intervals. In such an exemplary embodiment, the server 72 may be configured to send the notification message 112 in response to receipt of the inquiry 122 instead of sending the notification message 112 in response to receipt of the acknowledgment 110. Furthermore, the processing element 76 may be configured to send a predetermined number of inquiries at intervals controlled by the timing element 92 and, in response to failing to receive the notification message 112 after sending the predetermined number of inquiries, it may be assumed that the configuration data 100 was not properly received at the mobile terminal 10. Accordingly, the device management element 70 may retransmit the configuration data 100. In an exemplary embodiment, the device management element 70 may include a limited number of retries, which specifies a predetermined number of attempts at transmitting the configuration data 100 which the device management element 70 may undertake in response to any of the indications above of a failure to properly receive the configuration data 100 at the mobile terminal 10.

Figure 6:
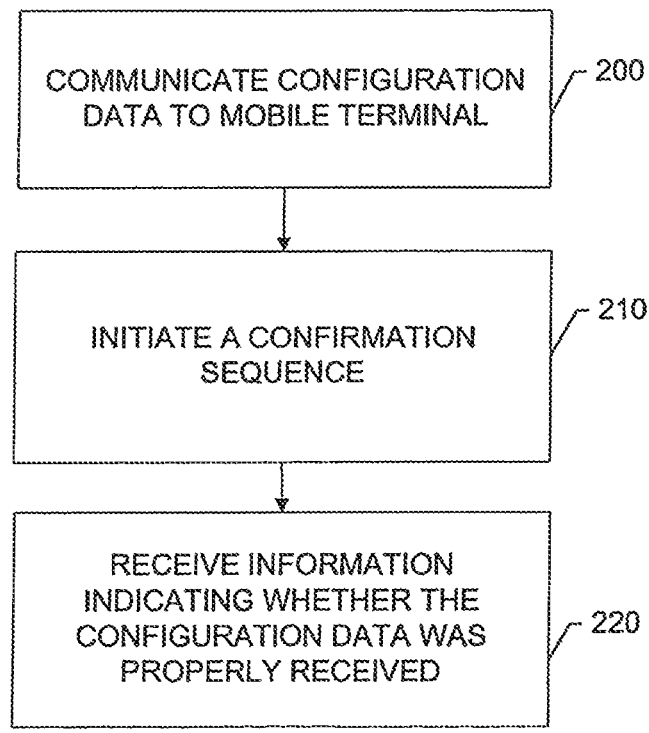
FIG. 6 is a block diagram according to an exemplary method for providing confirmed OTA terminal configuration according to an exemplary embodiment of the present invention.
Figure 7:
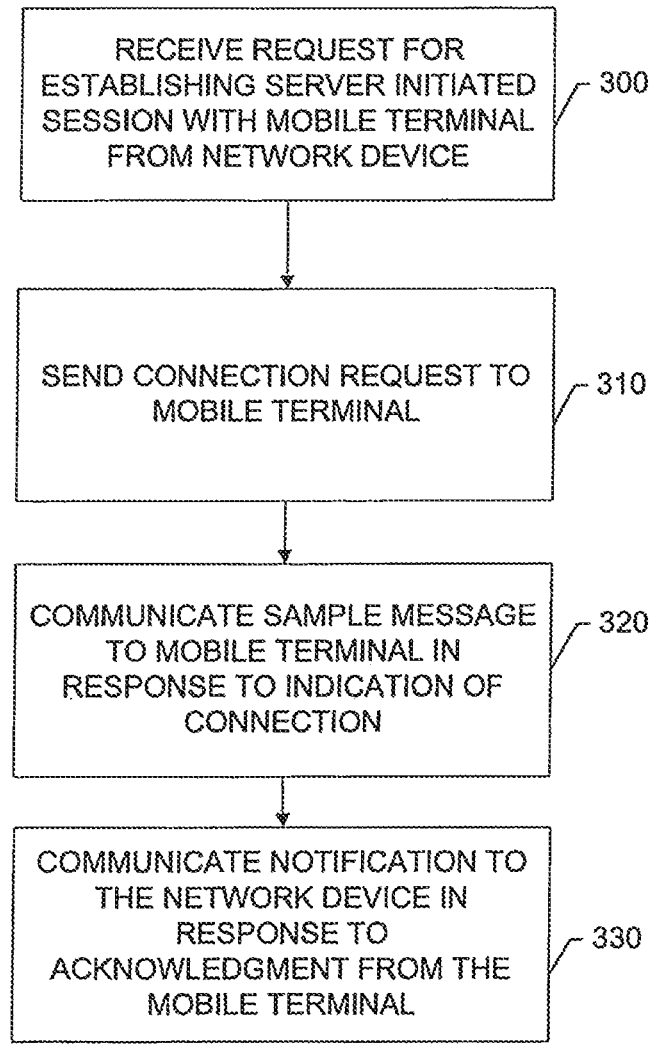
FIG. 7 is a block diagram according to an exemplary method for providing confirmed OTA terminal configuration according to an exemplary embodiment of the present invention.

FIGS. 6 and 7 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, FIG. 6 shows one embodiment of a method of providing confirmed OTA terminal configuration which includes communicating configuration data to a mobile terminal at operation 200. At operation 210, a confirmation sequence is initiated to confirm proper receipt of the configuration data at the mobile terminal. At operation 220, information is received indicating whether the configuration data was properly received at the mobile terminal. In an exemplary embodiment, as described above, the confirmation sequence initiation may include the establishment of a connection with the mobile terminal and the sending of a sample message to the mobile terminal to verify that the configuration data was properly received at the mobile terminal. In an alternative exemplary embodiment, the confirmation sequence may be performed by a network device such as a server. The method may include sending an inquiry to the network device to request information regarding whether the configuration data was properly received at the mobile terminal.

FIG. 7 shows another embodiment of a method of providing confirmed OTA terminal configuration which includes the confirmation sequence as described above. This exemplary method may include receiving a request for establishing a server initiated session with a mobile terminal from a network device at operation 300. At operation 310, a connection request is sent to the mobile terminal in response to receipt of the request for establishing the server initiated session. A sample message is communicated to the mobile terminal in response to an indication of a connection with the mobile terminal at operation 320. At operation 330, a notification is communicated to the network device in response to acknowledgment from the mobile terminal. The notification includes information indicating whether the configuration data was properly received at the mobile terminal.

The above described functions may be carded out in many ways. For example, any suitable means for carrying out each of the functions described above may be employed to carry out embodiments of the invention. In one embodiment, all or a portion of the elements of embodiments of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which embodiments of these inventions pertain having the benefit of the teachings presented in the foregoing descriptions and the associated drawings. Therefore, it is to be understood that embodiments of the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
   receiving configuration data at a mobile terminal from a device management element;
   receiving, from a server, a request for a connection between the mobile terminal and the server, the request generated by the server in response to initiation of a confirmation sequence by the device management element to confirm proper receipt of configuration data at the mobile terminal by causing the server to establish a connection with the mobile terminal, the device management element being a separate element from the server;
   sending, by the mobile terminal, information indicating whether the configuration data was properly received at the mobile terminal; and
   receiving, at the mobile terminal, re-communication of the configuration data from the device management element in response to an indication that the configuration data was not properly received at the mobile terminal.

2. The method of claim 1, wherein the information indicating whether the configuration data was properly received at the mobile terminal is sent by the mobile terminal to the server.

3. The method of claim 1, wherein the information indicating whether the configuration data was properly received is information sent during the execution of an application supported by the configuration data.

4. The method of claim 1, wherein the request for the connection between the mobile terminal and the server is initiated in response to an expiration of a timer associated with the transmission of the configuration data to the mobile terminal.

5. The method of claim 1, further comprising requesting, by the mobile terminal, the configuration data from the device management element and wherein the configuration data is sent to the mobile terminal in response to the request by the mobile terminal.

6. The method of claim 1, wherein the request for connection between the mobile terminal and the server comprises a multimedia messaging service (MMS) message.

7. The method of claim 6, further comprising sending a message from the mobile terminal to the server in response to receiving the request for the connection from the server, the message from the mobile terminal requesting information from the server.

8. The method of claim 7, further comprising:
   receiving, at the mobile terminal, sample content; and
   sending, to the server, an acknowledgement indicating that the sample content was received.

9. A non-transitory computer program product comprising at least one computer-readable storage medium having computer-readable program code portions stored therein, the computer-readable program code portions comprising instructions executable by a processor for:
   receiving configuration data at a mobile terminal from a device management element;
   receiving, from a server, a request for a connection between the mobile terminal and the server, the request generated by the server in response to initiation of a confirmation sequence by the device management element to confirm proper receipt of configuration data at the mobile terminal by causing the server to establish a connection with the mobile terminal, the device management element being a separate element from the server;
   sending, by the mobile terminal, information indicating whether the configuration data was properly received at the mobile terminal; and
   receiving, at the mobile terminal, re-communication of the configuration data from the device management element in response to an indication that the configuration data was not properly received at the mobile terminal.

10. The computer program product of claim 9, wherein the information indicating whether the configuration data was properly received at the mobile terminal is sent by the mobile terminal to the server.

11. The computer program product of claim 9, wherein the information indicating whether the configuration data was properly received is information sent during the execution of an application supported by the configuration data.

12. The computer program product of claim 9, wherein the request for the connection between the mobile terminal and the server is initiated in response to an expiration of a timer associated with the transmission of the configuration data to the mobile terminal.

13. The computer program product of claim 9, wherein the computer-readable program code portions further comprise instructions executable by a processor for: requesting, by the mobile terminal, the configuration data from the device management element and wherein the configuration data is sent to the mobile terminal in response to the request by the mobile terminal.

14. The computer program product of claim 9, wherein the request for connection between the mobile terminal and the server comprises a multimedia messaging service (MMS) message.

15. The computer program product of claim 14, wherein the computer-readable program code portions further comprise instructions executable by the processor for: sending a message from the mobile terminal to the server in response to receiving the request for the connection from the server, the message from the mobile terminal requesting information from the server.

16. The computer program product of claim 15, wherein the computer-readable program code portions further comprise instructions executable by the processor for:
   receiving, at the mobile terminal, sample content; and
   sending, to the server, an acknowledgement indicating that the sample content was received.

17. An apparatus comprising:
   a processing element;
   memory coupled to the processing element, the memory storing instructions executable by the processing element for:
      receiving configuration data at a mobile terminal from a device management element;
      receiving, from a server, a request for a connection between the mobile terminal and the server, the request generated by the server in response to initiation of a confirmation sequence by the device management element to confirm proper receipt of configuration data at the mobile terminal by causing the server to establish a connection with the mobile terminal, the device management element being a separate element from the server;

sending, by the mobile terminal, information indicating whether the configuration data was properly received at the mobile terminal; and receiving, at the mobile terminal, re-communication of the configuration data from the device management element in response to an indication that the configuration data was not properly received at the mobile terminal.

18. The apparatus of claim 17, wherein the information indicating whether the configuration data was properly received at the mobile terminal is sent by the mobile terminal to the server.

19. The apparatus of claim 17, wherein the information indicating whether the configuration data was properly received is information sent during the execution of an application supported by the configuration data.

20. The apparatus of claim 17, wherein the request for the connection between the mobile terminal and the server is initiated in response to an expiration of a timer associated with the transmission of the configuration data to the mobile terminal.

21. The apparatus of claim 17, wherein the computer-readable program code portions further comprise instructions executable by a processor for: requesting, by the mobile terminal, the configuration data from the device management element and wherein the configuration data is sent to the mobile terminal in response to the request by the mobile terminal.

22. The apparatus of claim 17, wherein the request for connection between the mobile terminal and the server comprises a multimedia messaging service (MMS) message.

23. The apparatus of claim 22, further comprising instructions executable by the processing element for:

sending a message from the mobile terminal to the server in response to receiving the request for the connection from the server, the message from the mobile terminal requesting information from the server.

24. The apparatus of claim 23, further comprising instructions executable by the processing element for:

receiving, at the mobile terminal, sample content; and sending, to the server, an acknowledgement indicating that the sample content was received.

\* \* \* \* \*